United States Patent [19]

Crothers

[11] 4,397,881
[45] * Aug. 9, 1983

[54] COOKIE BITS

[75] Inventor: William Crothers, Princeton, N.J.

[73] Assignee: Deer Park Baking Co., Hammonton, N.J.

[*] Notice: The portion of the term of this patent subsequent to Aug. 9, 2000, has been disclaimed.

[21] Appl. No.: 240,895

[22] Filed: Mar. 5, 1981

Related U.S. Application Data

[63] Continuation-in-part of Ser. No. 31,402, Apr. 19, 1979.

[51] Int. Cl.$^3$ .................. A23G 9/00; A21D 13/00
[52] U.S. Cl. ........................... 426/565; 426/549
[58] Field of Search ............... 426/549, 565, 572, 101, 426/249, 104; D1/1-4

[56] References Cited

U.S. PATENT DOCUMENTS

D. 241,685 10/1976 Warren et al. ..................... D1/4

OTHER PUBLICATIONS

Bohn, *Biscuit and Cracker Production*, 1st Ed., American Trade Pub. Co., N.Y. 1957, pp. 146-149.
Tighe, *Woman's Day Encyclopedia of Cookery*, vol. 3, Fawcett Pub., Inc., N.Y. 1966, p. 467.
Family Circle Cooking, vol. 5, U.S.A., 1972, pp. 564 & 606.

*Primary Examiner*—Raymond N. Jones
*Assistant Examiner*—Elizabeth A. Hatcher
*Attorney, Agent, or Firm*—Stephen E. Feldman; Marvin Feldman; Jules L. Chaboty

[57] ABSTRACT

Cookie bits of a count of approximately 2000 per lb. are disclosed wherein each bit has a specific part cylindrical, part conical configuration. These bits are also found to be, among other uses, particularly suitable for incorporation into ice cream without detracting from the quality, taste and appearance of the cookie bits or ice cream. The cookie bits permit adaptation and use of conventional cookie baking machinery when used in ice cream, or conventional ice cream machinery. The cookie bits may be flavored with fine cocoa, as well as other flavorings, and may be chocolate coated.

9 Claims, 4 Drawing Figures

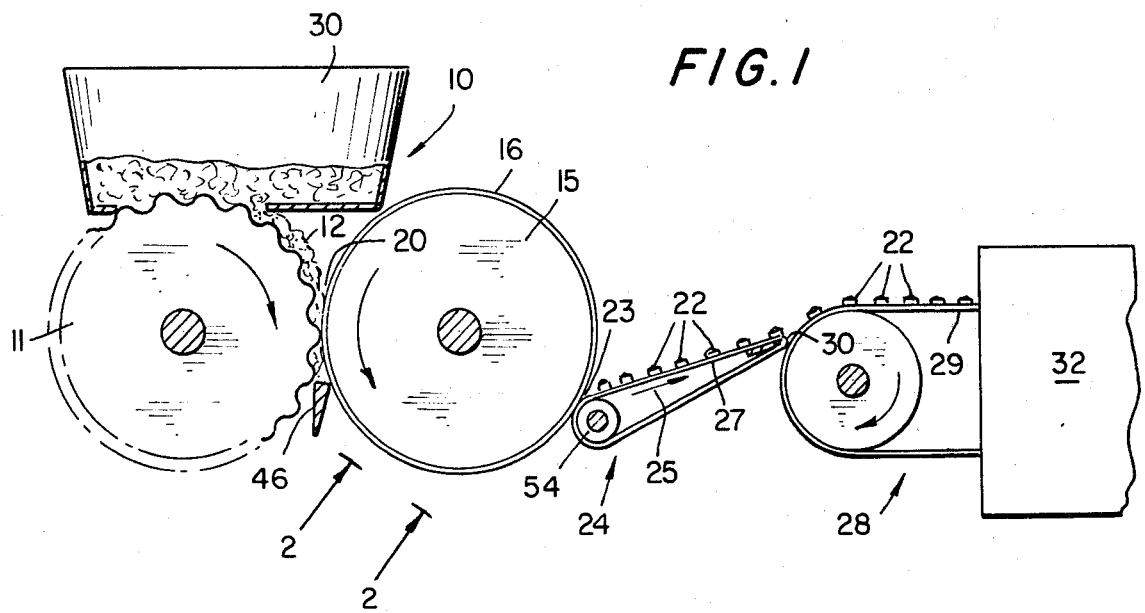
FIG. 1
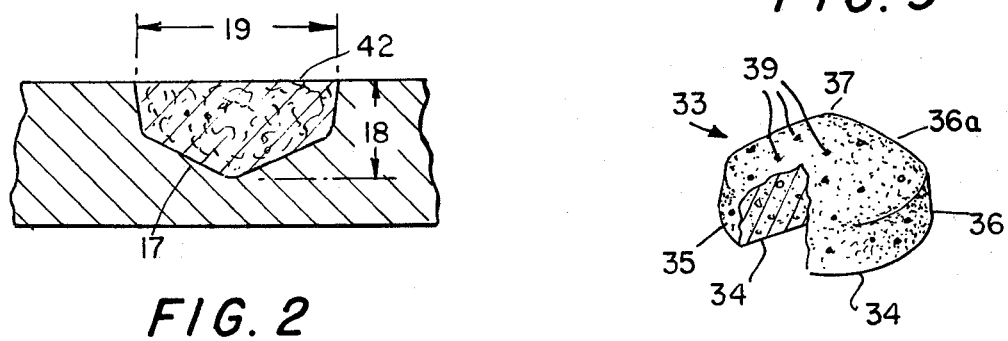
FIG. 2
FIG. 3
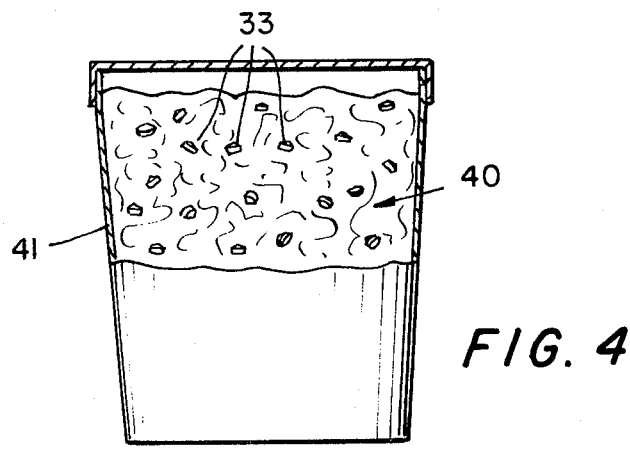
FIG. 4

COOKIE BITS

RELATED CROSS-REFERENCED APPLICATIONS

This application is a continuation-in-part of prior co-pending application Ser. No. 031,402, filed Apr. 19, 1979.

FIELD OF THE INVENTION

This invention relates to a cookie product. More specifically this invention relates to the combination of such cookie product incorporated into ice cream.

BACKGROUND AND DISCUSSION OF PRIOR ART

In the cookie making art it was common to make flat cookies. Attempts to make cookie shapes other than flat were often quite difficult, particularly as the size of each individual cookie was reduced. It was extremely difficult to form and handle cookie dough as the size became smaller and the shape was other than flat.

Now there is provided by the present invention a new cookie which provides both a novel configuration and size (i.e., high count per weight) and which cookie retains its integrity with handling and yet provides a cake-like quality when wetted.

The food industry and especially the ice cream industry was desirous of incorporating a cake product into food substances and ice cream but the prior art cake products would tend to either break down into fine pieces and thus "dirty" the food product i.e., the ice cream, or remain so hard and rough as to be undesirable to the palate in eating soft ice cream.

Heretofore it was also known in the prior art to incorporate various foods particulates into ice cream. Hassell, U.S. Pat. No. 901,394, granted Mar. 14, 1933, discloses the incorporation of popcorn and peanuts into ice cream. Anagnos, U.S. Pat. No. 1,968,732, granted July 31, 1934, discloses incorporating candy or nuts into ice cream. Musher, U.S. Pat. No. 2,355,028 disclosed an oat produce in ice cream. Forkner U.S. Pat. No. 3,020,164, granted Feb. 6, 1962, discloses candy bits in ice cream. And Durst et al, U.S. Pat. No. 3,872,229, granted Mar. 18, 1975 incorporates a simulated nutmeat product into ice cream.

Such prior art particulates were generally hard and irregularly-shaped and retained their hard or tough quality when incorporated into the ice cream.

Now there is provided by the present invention a novel cookie product having a cone-like configuration, with a high count per pound and being adaptable to be incorporated into ice cream or other edible food substances and yet maintain its recognizably cake-like texture.

It is therefore a principal object of this invention to provide novel cookie bits.

It is another principal object of this invention to provide cookie bits with a high count per pound.

It is another principal object of this invention to provide a process operation for making the aforementioned cookie bits.

It is another object of this invention to provide cookie bits useful in food substances, as well as other intended uses as hereinafter disclosed.

It is a further object of this invention to provide a process and operation as aforesaid wherein cookie making apparatus may be adapted therefor.

It is another object of this invention to provide a uniform cookie bit of specific configuration so as to be most suitable for incorporating into ice cream and other food substances.

It is another object of this invention to provide a high quality cookie product which is yet economically incorporated into ice cream and other food substances.

It is a further important aspect of this invention to provide cookie bits which assume and retain palatably acceptable texture and taste with extended storage in food substances, including ice cream.

The aforesaid as well as the other objects and advantages discussed herewith will become apparent from reading of the following description, the adjoined claims and the drawings in which:

FIG. 1 is a schematic illustration of the process of this invention showing the cookie bits greatly enlarged;

FIG. 2 is a greatly enlarged fragmentary view of the cookie bit forming sheet taken along line 2—2 of FIG. 1;

FIG. 3 is greatly enlarged perspective view of a cookie bit; and

FIG. 4 is a reduced scale sectional view of bulk ice cream with the cookie bits therein.

DESCRIPTION OF THE PREFERRED EMBODIMENTS

Broadly speaking this present invention comprises a cookie bit which has the form of a conical-related configuration and having an extremely high count per pound, of from 1,500 to 2,500/lb. and preferably about 2,000/lb.

The conical bit configuration, with the composition as subsequently described, provides a cookie which minimally crumbles, unlike flat cookies, and can maintain its integrity when incorporated into a food product such as ice cream.

Bit 33 comprises a specific cone-related shape and is formed with a flat 34, rounded periphery of the base 35, slightly tapered cylindrical sides 36 and more tapered sides 36a converging to a rounded apex 37. The height of the apex 37 is equal to approximately one-half the diameter of the base and is approximately 3/16th of an inch.

It has been found that the part cylindrical, part conical cookie bit, as afore-described, provides an exceptionally low center of gravity while permitting mechanical handling, including belt transfer and blending, without breakage.

In a more specific aspect this invention comprises cookie bits as aforementioned which can be used alone or incorporated into various food substances, including ice cream, and retain an acceptable taste and consistency in the food substances. In ice cream, the cookie bits absorb some moisture from the ice cream but do not break down and in fact retain a true cake-like consistency in the ice cream.

Bit 33 is formed with a plurality of pores 39 which permit the absorption of a certain amount of moisture, such as the water present in ice cream.

The bits 33, by virtue of the novel configuration may be conventionally screw impeller blended with the food substance such as ice cream to form a bulk produce 40 in container 41 having the bits 33 dispersed in the food substance (FIG. 4). The cookie bits 33 unlike conventional flat cookies retain their dimensional integrity despite the mechanical blending action. The bits compose about 8 to 10% of the food substance by weight.

Broadly speaking, the composition of the present invention for forming the cookie bit, comprises flour, sugar and shortening, wherein it has been found that a specific sugar to shortening ratio is important to obtain and retain the desired cake-like characteristics when the cookie is used in food substances such as ice cream. Specifically, it has been found that where the sugar/shortening ratio is in the rage of 1.5:1 to 2.5:1, and preferably about 2.0:1, the desired characteristics of physical integrity with partial water absorption to form and retain a cake-like character in ice cream is obtained.

It is also to be understood that the term "sugar" as used hereinbefore and hereinafter throughout the specification and claims encompasses both the singular and plural.

It is also understood that the term "shortening" as used hereinbefore and hereinafter throughout the specification and claims includes all fats and oils present in the dough composition.

In Table I below, there is a typical ingredient listing of a dough composition pursuant to the present invention.

TABLE I

| Ingredient | Wet Wt.[6] (lbs) | Dry Wt.[6] (lbs) |
|---|---|---|
| Flour | 200 | 176 |
| Sugar[1] | 60 | 60 |
| Invert Sugar[2] | 20 | 13 |
| Shortening[5] | 40 | 40 |
| Cocoa[3] | 15 | 15 |
| Black Cocoa | 5 | 5 |
| Red Solution | 4 oz. | — |
| Burnt Sugar | .5 | .5 |
| Leavening[4] (AMMONIUM BI-CARBONATE) | .5 | — |
| Baking Soda | 1 | .5 |
| Vanilla | 16 oz. | — |
| Water | 20 | — |
| Salt | 2 | 2 |

[1]Cane Sucrose
[2]Nulomoline
[3]Droste brand (22-24% cocoa fat)
[4]Ammonia
[5]Partially hydrogenated soya bean oil, palm oil and/or cottonseed oil.
[6]Unless specified in fluid ounces (oz.)

The following Tables IA through V illustrate variations within the contemplation of the invention.

TABLE IA

Ice Cream Cookie Bits (vanilla)

| Ingredient | Wet Wt. (lbs) | Dry Wt. (lbs) |
|---|---|---|
| Flour | 260 | 228 |
| Sugar | 102 | 102 |
| Invert Sugar | 7 | 4.5 |
| Shortening | 85 | 85 |
| Leavening (AMMONIUM BI-CARBONATE) | 1.5 | — |
| Baking Soda | .4 | .2 |
| Vanilla | 1 oz. | — |
| Water | 22 | — |
| Yellow Solution | .1 | — |
| Salt | 1.5 | 1.5 |
| Egg Powder | 3 | 2.5 |
| Baking Powder | .25 | .1 |
| Lecithin | .1 | .1 |

TABLE II

Health Food Cookie Bits

| Ingredient | Wet Wt. (lbs) | Dry Wt. (lbs) |
|---|---|---|
| Flour | 100 | 88 |
| Sugar | 55 | 55 |
| Invert Sugar | 15 | 9.7 |
| Shortening | 30 | 30 |
| Leavening (AMMONIUM BI-CARBONATE) | 1 | — |
| Baking Soda | 1 | .5 |
| Vanilla | 5 oz. | — |
| Water | 15 | — |
| Yellow Solution | .1 | — |
| Salt | 1.5 | 1.5 |
| Egg Powder | 4 | 3 |
| Lecithin | .1 | — |
| Bran | 5 | 5 |
| Rolled Oats | 15 | 14 |
| Sesame | 5 | 4 |
| Molasses | 5 | 4 |
| Spice Mix | .25 | .25 |

TABLE III

Cookie Confection

| Ingredient | Wet Wt. (lbs) | Dry Wt. (lbs) |
|---|---|---|
| Flour | 260 | 228 |
| Sugar | 102 | 102 |
| Invert Sugar | 7 | 4.5 |
| Shortening | 85 | 85 |
| Leavening (AMMONIUM BI-CARBONATE) | 1.5 | — |
| Baking Soda | .4 | .2 |
| Vanilla | 1 oz. | — |
| Water | 22 | — |
| Yellow Solution | .1 | — |
| Salt | 1.5 | 1.5 |
| Egg Powder | 3 | 2.5 |
| Baking Powder | .25 | .1 |
| Lecithin | .1 | .1 |

The aforesaid composition was formed into bits. The bits are coated with caramel and/or chocolate or compound coatings.

TABLE IV

Cheese Snacks

| Ingredient | Wet Wt. (lbs) | Dry Wt. (lbs) |
|---|---|---|
| Flour | 260 | 228 |
| Sugar | 102 | 102 |
| Invert Sugar | 7 | 4.5 |
| Shortening | 85 | 85 |
| Leavening (AMMONIUM BI-CARBONATE) | 1.5 | — |
| Baking Soda | .4 | .2 |
| Vanilla | 1 oz. | — |
| Water | 22 | — |
| Yellow Solution | .1 | — |
| Salt | 1.5 | 1.5 |
| Egg Powder | 3 | 2.5 |
| Baking Powder | .25 | .1 |
| Lecithin | .1 | .1 |
| Cheese topping | | 47.0 |

TABLE V

Peanut Butter Cookie Snack

| Ingredient | Wet Wt. (lbs) | Dry Wt. (lbs) |
|---|---|---|
| Flour | 100 | 88 |
| Sugar | 40 | 40 |
| Invert Sugar | 10 | 6.5 |
| Shortening | 20 | 20 |

TABLE V-continued

Peanut Butter Cookie Snack

| Ingredient | Wet Wt. (lbs) | Dry Wt. (lbs) |
|---|---|---|
| Leavening (AMMONIUM BI-CARBONATE) | .5 | — |
| Vanilla | 12 oz. | — |
| Water | 16 | — |
| Peanut Butter | 45 | 45 |
| Yellow Solution | .12 | — |
| Salt | 1.5 | 1.5 |
| Soya Flour | 5 | 4 |
| Corn Starch | 5 | 5 |

The dough is mixed and baked under conventional processing operations and conditions as is well known in the art.

In the aforesaid composition there is a total of 76 lbs. of sugar (can plus invert) and a total of 43 lbs. of shortening (including 15% cocoa fat in a total of 20 lbs. of cocoa). Therefore, the ratio of sugar to shortening is about 1.8:1.

Without wishing to be bound by any theory or mechanism, it has surprisingly been found that the composition having the specified sugar:shortening ratio, when formed and baked as a cookie bit provides a structure which will maintain its structural integrity when dispersed in food substances such as ice cream and yet absorbs water to some degree so as to provide a pleasant cake taste and texture to the consumer.

Referring to FIG. 1, there is shown a processing schematic showing the apparatus for producing the cookie bits, wherein the apparatus is generally referred to as numeral 10. This apparatus is described in more detail in my patent application entitled METHOD AND APPARATUS TO MAKE COOKIES, U.S. Pat. No. 4,229,487, granted Oct. 21, 1980. Apparatus 10 comprises a feed roll 11 which is formed of corrugated metal 12 mounted on a periphery of the roll 11. Roll 11 rotates so as to pick up cookie dough 13 from feeder 14. Roll 11 is in contact with drum 14 on which is mounted cylindrical metal roll 16. Roll 16 is formed with a plurality of inverted cavities 17. which are shown as frustoconical impressions, best shown in FIG. 2, and is Teflon-coated.

Each cavity 17 is of depth 18 which is equal to the diameter 19 of the crevice, which dimensions are approximately 3/16th of an inch. The metal roll 16 is highly polished so that the dough will flow readily into and out of the cavities.

Dough 13 is picked up by the corrugations on roll 11 and pressed into the cavities 17 at point of contact 20. The drum roll 16 is then rotated until doctor blades 46 strip off the excess dough. Once the drum rotates to a point still below the horizon, the dough cones or bits 22 are pulled out of the cavities 17 onto the section 23 of conveyor 24 by the frictional force of conveyor belt section 23, through the pressing contact of rubber roller 54, against the dough surface 42 (FIG. 2). The cones 22 are conveyed upwardly as at 25 on endless conveyor belt 27.

A second conveyor 28 is disposed proximate conveyor 24 and belt 29 of conveyor 28 contact belt 27 at point 30. The belts 27 and 29 thus form an upward ramp so that bits 22 are transferred from belt 27 onto belt 29. This is contrary to conventional cookie transfer wherein the cookies are transported downward from the feed belt to the receiving belt. However, with the small shape, such downward feeding is not feasible insofar as the bit, by virtue of the high center of gravity, would tip over during belt transfer.

It has now been found that in that specific upward transfer as shown and described herein the dough bits 22 remain upright.

The dough bits 22 are transferred via belt 29 to oven 32 whereat the bits are then baked to form the finished cookie bits 33, best shown in FIG. 3.

It is also to be reiterated that the cookie bit of the present formulation unlike prior art cookie compositions will not disintegrate in absorbing water from ice cream but instead merely softens somewhat so as to provide a pleasant firm texture. The present limited flour component, and the limited sugar:shortening ratio is believed to contribute to this.

The conical bit configuration with the present composition provides a cookie which minimally crumbles, unlike flat cookies. The conical shape however presents a greater surface area in the mold to base surface outside the mold ratio, and it was found necessary to both Teflon coat the cylindrical die plate and to provide a much thinner conveyor blanket for cookie bit release than is customary, in order to deliver the bits over a very sharp nose bar, which nose bar is much thinner than in general industrial use.

In the prior art the "count per pound" of cookies varied from about 35 (heavy sandwich creme) up to about 200 (small shortbread or wafer). The cookie bits of the present invention, however, have a count per pound of about 1,500 to 2,500, and generally about 2,000 per pound. The size-weight volume relationship of the present cookie bits permits a broad range of packaging.

It is also noted that the rounded conical bit achieves the desired handling characteristics of a spherical particle without presenting the difficulties inherent in making spherical cake or cookie products.

In addition to its use in ice cream, the cookie bits can be used as a dessert topping or additive, cereal or additive to a cereal; health food; confection (coated or uncoated); cheese snack or peanut butter snack.

As stated, this cookie bit is most advantageously employed in food substances such as ice cream to provide a novel taste and textured product. It has also been found that volume economics of substituting cookie bits for ice cream is in agreement, so that the finished product is commercially attractive. It is also to be noted that the cookie bits can be sold and enjoyed alone without combining with ice cream. While the aforesaid described a preferred embodiment, various obvious modifications are within the spirit and scope of the invention as defined in the adjoined claims.

What is claimed is:

1. An ice cream product comprising:
   a. ice cream;
   b. a plurality of cookie bits of a count of about 1,500 to 2,500/lb. dispersed in said ice cream, each of said bits being formed into a cylindrical body and conical top portion, and comprising flour, sugar, and shortening, and wherein the sugar: shortening ratio is from 1.5:1 to 2.5:1, and wherein the bit is porous so as to absorb moisture in ice cream but retain its shape after such absorption.

2. An ice cream product of claim 1, wherein said bits are present in an amount of 8 to 10 percent by weight of the ice cream.

3. The ice cream product of claim 1, wherein the ice cream and bits are blended together.

4. The ice cream products of claim 3, wherein the ice cream and bits are screw impeller blended without damage to the bits.

5. The ice cream product of claim 1, said count is 2,000/lb.

6. The ice cream product of claim 1, wherein the apex of the cone of each bit is rounded and approximately one-half the diameter of the base.

7. The ice cream product of claim 6, wherein the periphery of the cone base is rounded.

8. The ice cream product of claim 1, wherein said sugar comprises the combination of a sucrose and an invert sugar.

9. The ice cream product of claim 1, wherein said cone of each cookie bit has a height of about 3/16th of an inch and a base diameter of about 3/8th of an inch.

* * * * *